(12) United States Patent
Angal et al.

(10) Patent No.: US 6,298,378 B1
(45) Date of Patent: Oct. 2, 2001

(54) EVENT DISTRIBUTION SYSTEM FOR COMPUTER NETWORK MANAGEMENT ARCHITECTURE

(75) Inventors: Rajeev Angal, Santa Clara; Shivaram Bhat, Sunnyvale; Subodh Bapat, Palo Alto; Ragavendra Sondur, Santa Clara, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/205,072

(22) Filed: Dec. 4, 1998

(51) Int. Cl.[7] .................................................. G06F 15/173
(52) U.S. Cl. .......................... 709/223; 709/224; 370/254
(58) Field of Search ................................. 709/223, 224; 370/254

(56) References Cited

U.S. PATENT DOCUMENTS

| | | | |
|---|---|---|---|
| 5,220,674 | * 6/1993 | Morgan et al. | 709/223 |
| 5,355,484 | * 10/1994 | Record et al. | 395/704 |
| 5,448,737 | 9/1995 | Burke et al. | |
| 5,592,664 | * 1/1997 | Starkey | 707/1 |
| 5,687,317 | * 11/1997 | Hughes et al. | 709/205 |
| 5,805,785 | * 9/1998 | Dias et al. | 714/4 |
| 5,870,561 | * 2/1999 | Jarvis et al. | 709/238 |
| 5,999,972 | * 12/1999 | Gish | 709/219 |
| 5,999,978 | * 12/1999 | Angal et al. | 709/229 |
| 6,064,656 | * 5/2000 | Angal et al. | 370/254 |
| 6,131,118 | * 10/2000 | Stupek et al. | 709/223 |

* cited by examiner

Primary Examiner—Krisna Lim
(74) Attorney, Agent, or Firm—Beyer Weaver & Thomas, LLP (57) ABSTRACT

Improved techniques for reporting events raised by entities running on computer networks are disclosed. The techniques provide an event distribution system that handles events generated by various software and other entities installed on a computer or communications network. The event distribution system is capable of handling large volumes of event traffic and can be installed and operated separately from other network management software components to provide thereby more robust operations in the case one or more components fail. In addition, the event distribution system can be scaled readily to handle greater volumes of network traffic. In one embodiment, an event distribution service is coupled with an event source. In addition, an event listener is provided on the computer network. When an event is generated from the event source and received by the event distribution system, the event distribution system processes and forwards the event, or a notification of the event, to an appropriate listener.

21 Claims, 11 Drawing Sheets

EVENT DISTRIBUTION SYSTEM FOR COMPUTER NETWORK MANAGEMENT ARCHITECTURE

BACKGROUND OF THE INVENTION

1. Field of the Invention

The present invention relates to computer network architectures, and, more specifically, to software for managing computer and communications networks. More particularly, the present invention provides software, systems, and apparatus for managing software entities and hardware over a computer network. The present invention has applications in the areas of computer science, computer network management, and computer software.

2. The Related Art

The demands on computer network managers have grown exponentially as the size and extensiveness of computer networks has grown over the past decade. Starting from the relatively simple task of maintaining communication among a relatively small number of mainframe computers, network managers must now coordinate operations among thousands of computers, printers, servers, and other networked devices. With the advent of the Java® and Jini™ programming languages, even household devices will soon become linked over computer networks running on household "intranets" that in turn are linked to the worldwide Internet. Thus, there appears to be no end in sight to the increasing burden on network managers.

To control and coordinate the software associated with the myriad of networked computers and other devices, network managers employ software designed to track, establish communications with, and control various software entities or processes that exist independently or represent the networked devices. Entities that represent networked devices are also referred to herein as "agents". The software used by the network manager interacts with various "platform-level" software services to enable the network manager to locate and interact with the various entities running on the network. Typically all communications between the network manager and the entities running on the network, as well as communications between entities, are managed by a central service.

The entities on the network can communicate among each other and the network manager by sending and receiving messages. Messages can be requests, responses, or events. Events may be alarm states (e.g., a warning of a communications failure or an error state) or some other public notification of the change of state in the entity. Various entities on the network "subscribe" to events generated by other entities so that co-operative relationships among entities can be maintained. Given the number and variety of events that can be generated, the volume of events being processed by the network management software can be great for large computer networks even when few or no error messages are being generated. This volume can slow system performance dramatically. Also, many systems rely on the same central software service to process both communications connection and events. This reliance on a single service to process such high volumes of data creates a risk of catastrophic network failure if the central software service fails. Such risks and decreased performance are not acceptable for large-scale networks that must be available twenty-four hours a day, seven days a week. Also, the event handing system should be scalable to allow efficient upgrades to computer network capacity.

Therefore, it would be beneficial to provide an event-handling system for a computer network management architecture that can process large numbers of events and continue to operate even if a central piece of the network management software fails. It would also be beneficial to have event-handling software that can be scaled efficiently as new devices and entities are added to the computer network. The present invention meets these and other needs.

SUMMARY OF THE INVENTION

The present invention meets the above-described needs by providing, in one aspect, an event-handling system for computer and communications network management architectures that has high processing capacity and is robust. The design of the event handling software, system, and methods provided by the present invention is readily scaled to handle efficiently the demands of ever-growing computer and communications networks and can be run in processes separate form other network management functions. Such a capability reduces the risk of a catastrophic network management failure.

In one aspect, the present invention provides a method for reporting events raised by entities running on a computer network. According to one embodiment of this aspect of the invention, an event distribution service coupled with an event source and an event listener is provided on the computer network. An event is generated from the event source and received by the event distribution system. The event distribution system processes the event and forwards the event, or a notification of the event, to the listener.

In a more specific embodiment, the method of the invention includes the step of providing an event sink and an event adapter. Sill more specifically, the invention includes the step of configuring the event sink and event adapter using an event distribution registry. In one embodiment, the event adapter receives the event and forwards the event to the event sink. The event sink compares the event with a table of filters. In another embodiment, the event adapter both receives and filters the event.

In another aspect, the present invention provides a system for distributing events generated by an event source on a computer network to event listeners on the computer network. The system provides, in one embodiment, an event distribution registry. The event distribution registry is configured to provide event filters and event listener addresses corresponding to the event listeners. The event distribution registry is coupled with an event adapter that is configured to receive events generated by event source. The event adapter is coupled with an event sink that is configured to forward events to the event listeners.

In a more specific embodiment of the system just described, the event distribution registry is configured to assign event sinks to the event adapters and the event listeners to the event sinks. In another more specific embodiment, of the invention, the event sinks are configured to filter the events. In alternative embodiment, the event adapters are configured to filter the events.

In other aspects, the present invention includes computer-readable media and computer data signals on a carrier wave that include instructions for providing an event distribution service on a computer network. The event distribution is configured to be coupled with an event source and an event listener, and receive and process an event generated by the event source. The event distribution service of the invention forwards the event to the event listener.

These and other aspects and advantages will become apparent when the Description below is read in conjunction with the accompanying Drawings.

DESCRIPTION OF SOME EMBODIMENTS OF THE INVENTION

The present invention provides an event distribution system that handles events generated by various software and other entities installed on a computer or communications network. The event distribution system provided by the present invention is capable of handling large volumes of event traffic and can be installed and operated separately from other network management software components to provide thereby more robust operations in the case one or more such components fails. The event distribution system provided by the present invention can be scaled readily to handle greater volumes of network traffic.

Figure 1:
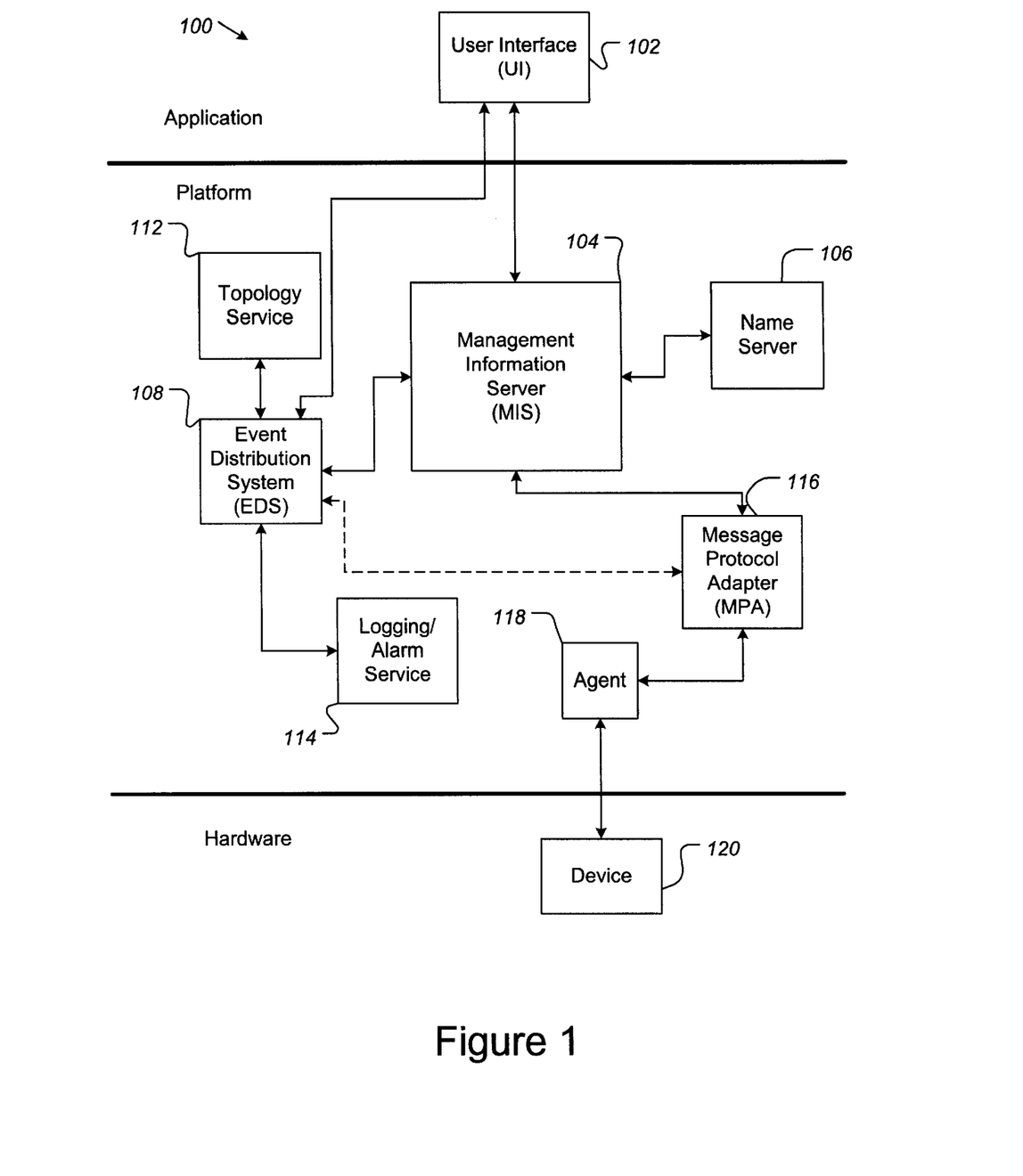
FIG. 1 is a schematic illustration of various network management software components in accordance with on embodiment of the present invention.

FIG. 1 at 100 illustrates various software and hardware components used to manage computer network operations in accordance with one embodiment of the present invention. Generally, computer network software and hardware operations can be organized conceptually into three layers: an Application layer, a Platform layer, and a Hardware layer. The Application layer generally comprises user interface ("UI") software 102 designed to allow network operators to communicate with software and hardware installed on the network. Such communications include, but are not limited to, sending requests, receiving alarms, receiving status reports, locating devices, and controlling devices. A Hardware layer represent the various devices installed on the network, such as device 120. Examples of devices include communications devices, routers, severs, modems, computers, printers, network interface cards, and hubs. Still more examples of applications and devices will be apparent to those having skill in the computer science and computer network arts. In particular, the software, systems, and methods described herein can be applied to communications networks by analogy to the presentation provided for communications networks embodiments of the present invention. Such adaptation can be made by those of skill in the computer science, network, and communications arts where needed.

Between the Application and Hardware layers is the Platform layer. This layer comprises network management software designed to allow the network administrator operating an application such as UI 102 access to entities and devices on the network. The network management software also operates to enable communications among various entities installed on the network, including event communications. In one embodiment, the network communications are handled by a central Management Information Server ("MIS") 104 that coordinates messages sent between entities running on each of the network layers. MIS 104 interacts with a Name Server 106 that provides a database comprising names and addresses for all entities installed on the network. An example of one such Name Server can be found in co-pending U.S. patent application Ser. No. 09/205,323 filed on even date herewith and which is incorporated herein by reference for all purposes. A Topology Service 112 and a Logging/Alarm Service 114 provide resources for managing network entities and alarms. Examples of these services can be found in co-pending U.S. patent application Ser. Nos. 09/205,826 and 09/205,911 each of which is incorporated herein by reference for all purposes. The platform level entities further include an Agent 118 and a Message Protocol Adapter ("MPA") 116 that allow communication between Device 120 and MIS 104. One example of an MPA can be found in co-pending U.S. patent application Ser. Nos. 09/205,078 and 09/205,325.

In communication with the MIS, Topology Server, Logging/Alarm Service, and the UI is an Event Distribution System ("EDS") 108. As described hereinbelow, EDS 108 processes event signals and propagates those signals to various "listener" entities on the network. In one embodiment, EDS 108 is a process separate from MIS 104. In another embodiment, EDS 108 runs on a separate processor to reduce computational overhead on the processor running MIS 104. Those having skill in the computer science and network arts will appreciate that such an embodiment includes the advantages of greater speed since the processing chores of the EDS and MIS are divided between two processors. In addition, using a second processor to run EDS processes reduces the chance that both the EDS and MIS will fail simultaneously. In still another embodiment, EDS 108 functions within the same process as MIS 104.

Figure 2:
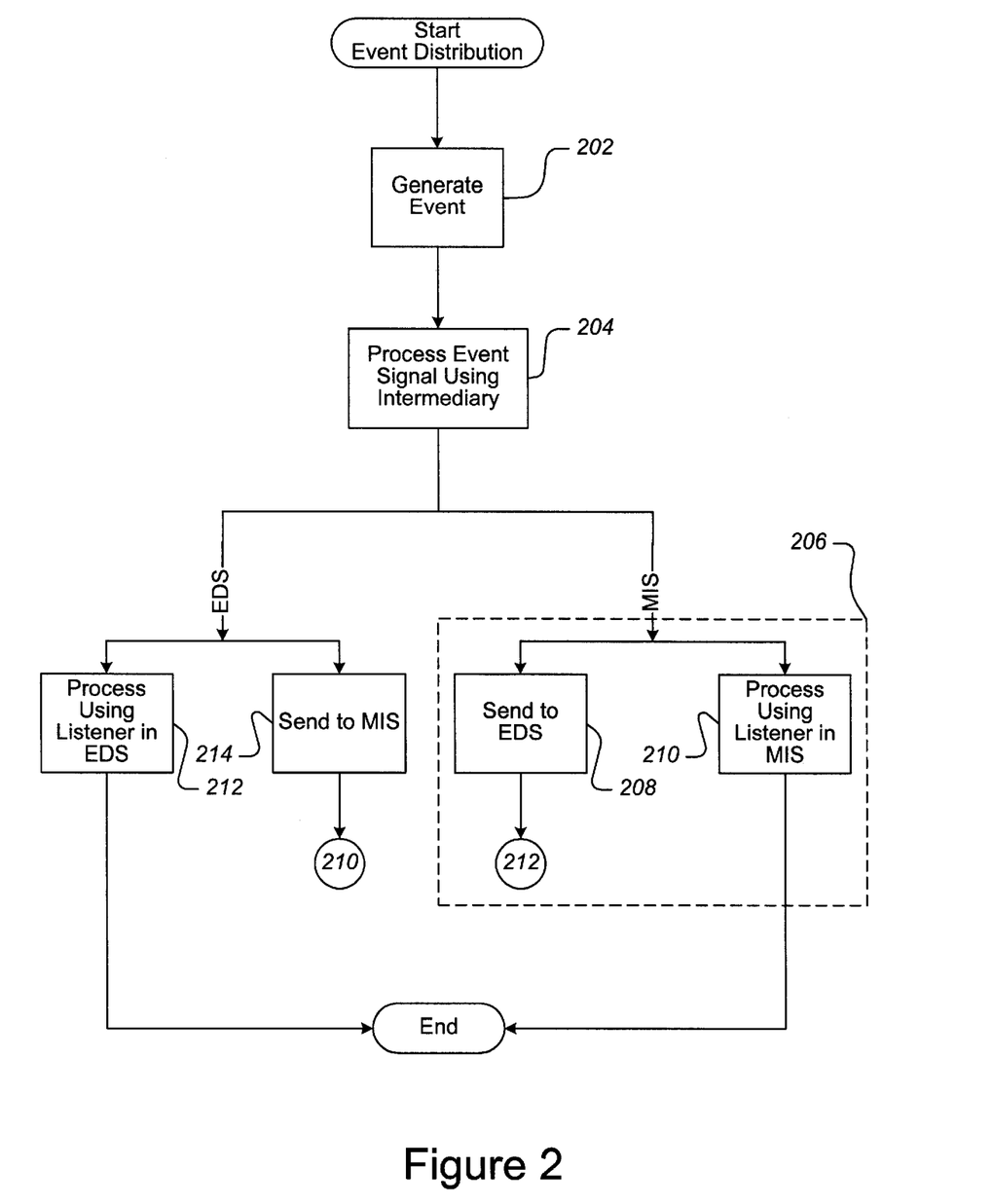
FIG. 2 is a flowchart illustrating the operation of one embodiment of the present invention.

The initiating of event processing is described in FIG. 2. Starting at 202 an event is generated by an entity on the network. Generally, events are signals that indicate one or more changes in the state of an entity or device residing on the network. Examples of events include communications alarms (e.g., a device has come on-line, has gone off-line, or has a problem); equipment alarms (e.g., an error state has occurred); quality of service alarms (e.g., the strength of a communications signal); security alarms indicating unauthorized access has been detected; and attribute change alarms (e.g., data for a device has been changed or a device is no longer available for reasons other than an error). An intermediary process then processes the event signal at step 204. The intermediary can be any process(es) running between the event-generating device and the EDS or, in some embodiments, the MIS. The intermediary can be an agent, such as Agent 118, and/or an MPA such as MPA 116.

In one embodiment the intermediary (e.g., the MPA) directs the event to either the MIS or the EDS. The determination whether the event is directed to the MIS or EDS can be made using a variety of criteria. Examples of such criteria include the source of the event, the severity of the event, the type of intermediary, and the type of listener. If the event is directed to the MIS, as indicated by box 206, then the event is either directed to the EDS via the MIS at step 208 or processed by the MIS at step 210. Again, various criteria can be used to determine whether the MIS or EDS processes the event. For example, the event can be forwarded to the EDS for processing if the MIS determines it does not have a listener for the event. Alternatively, the EDS processes the event analogously to the MIS. At step 212, the EDS receives and processes the event. In some cases the EDS will forward the event to the MIS. Again, the criteria for determining whether the EDS processes or forwards the event can be those just described for the MIS.

Alternatively, the EDS can process all events, in which case box the MIS branch and 206 are ignored. Those of skill in the computer science and network arts will appreciate the use of the EDS as the sole processor of events can be more efficient than dividing event processing tasks between the EDS and MIS. However, in some systems where the EDS described herein is being added to a computer network management system in which the MIS also performs event handling, compatibility may be enhanced by sharing event processing responsibilities between the MIS and EDS. Such configuration decisions and implementation can be performed by those of skill in the art using the teachings herein.

Figure 3:
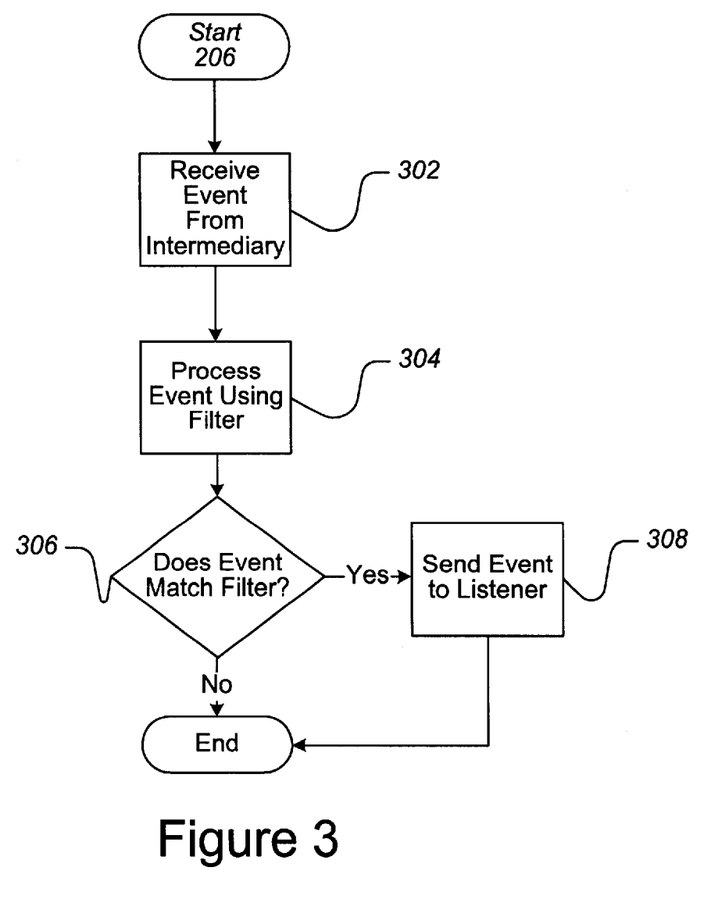
FIG. 3 is a flowchart illustrating the operation of step 206 of FIG. 2.

In one embodiment, the EDS and MIS use substantially identical processing methods, i.e., steps 212 and 210 are substantially identical. In an alternative embodiment, the MIS and EDS process events using different procedures. FIG. 3 illustrates an embodiment of the procedures used by the MIS in a mixed MIS-EDS embodiment as illustrated in FIG. 2. At step 302, the MIS receives the event from the intermediary. The event is processed using a filter at step 304. In one embodiment the filter is a filter having the structure discussed below with respect to FIG. 4. At step 306, a determination is made whether the event has a match on the filter. If there is a match, then, at step 308, the event is sent to a listener corresponding to the match. Otherwise the process ends.

Figure 4:
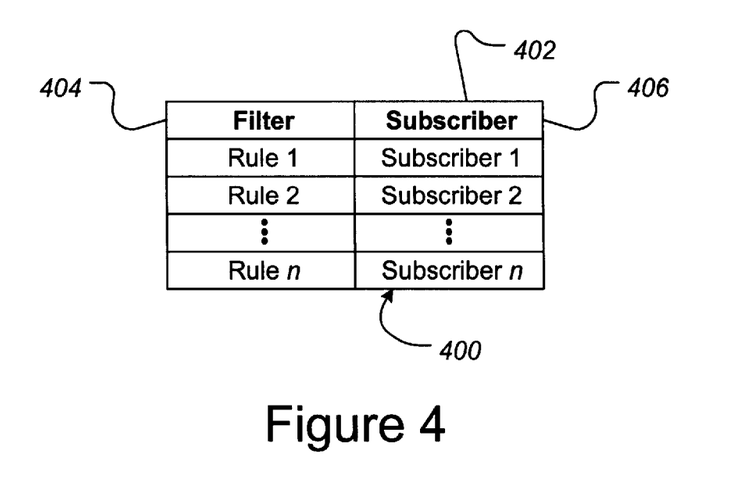
FIG. 4 is an illustration of a filter table in accordance with one embodiment of the present invention.

FIG. 4 illustrates an embodiment of an event filter for use by the MIS at 400. In one embodiment, the MIS comprises a table having a first column containing a series of Filters and a second column of Subscribers corresponding to the Filters. More particularly, the Filters column includes conditional statements corresponding to events required by the listener. In one embodiment, there is a one-to-one correspondence between Filters and Subscribers. If an event matches a Filter, then notification of the event is forwarded to the entities in the corresponding Subscriber column. In one embodiment, the Filters are written using CMIS filter syntax. However, those of skill in the computer science and network arts will appreciate that any syntax effective for filtering events can be used with the present invention.

Figure 5:
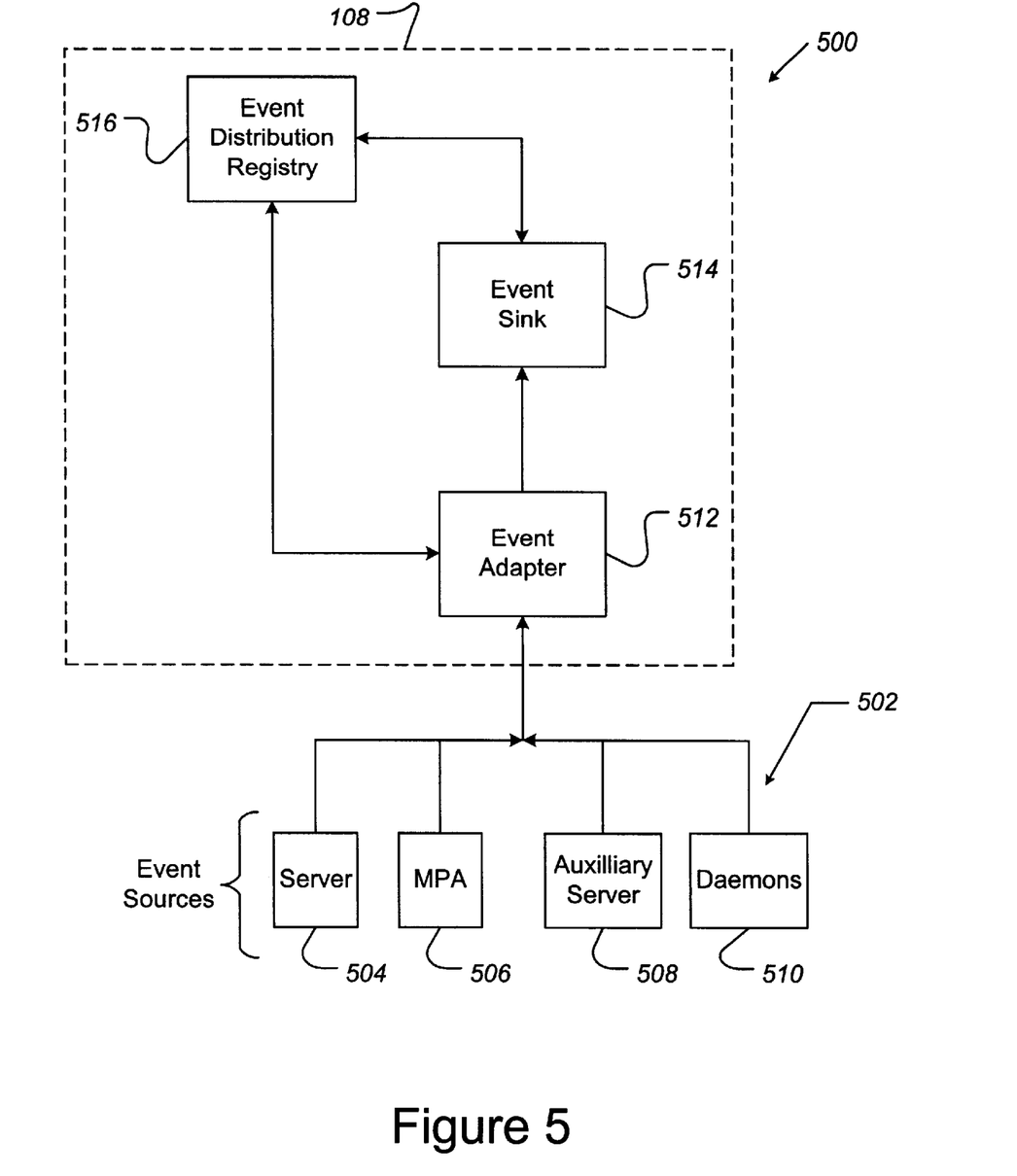
FIG. 5 is a schematic illustration of various event-handling software components in accordance with on embodiment of the present invention.

A schematic of the structure of one embodiment of EDS 108 and event sources is provided in FIG. 5 at 500. There, events from event sources 502, such as MIS events 504, MPA-forwarded events 506, events from auxiliary servers 508 (e.g., the topology server, the logging/alarm server, and the name server), and events from various daemons 510 (e.g., the SNMP trap daemon), are first passed to Event Adapter ("EA") 512. As described in greater detail below, Event Adapter 512 forwards the events to Event Sink 514 in accordance with parameters received from Event Distribution Registry 516. The Event Distribution Registry ("EDR") also directs Event Sink ("ES") 514 to forward events to various subscribers according to filters defined by the Event Listeners and loaded into the Event Sink 514. In one embodiment, Event Sink 514 maintains a set of filters similar to those described in FIG. 4. The filters are used to determine which listeners receive an event processed by Event Sink 514. Alternatively, Event Adapter 512 performs the discrimination and forwards the selected events to Event Sink 514. As described below, there can be more than one Event Sink and more than one Event Adapter. In one embodiment, the number of event adapters and sinks is determined at start-up. Alternatively, the number of event adapters and/or sinks can be determined dynamically, with more adapters and/or sinks being opened or closed, as network demands require.

Figure 6:
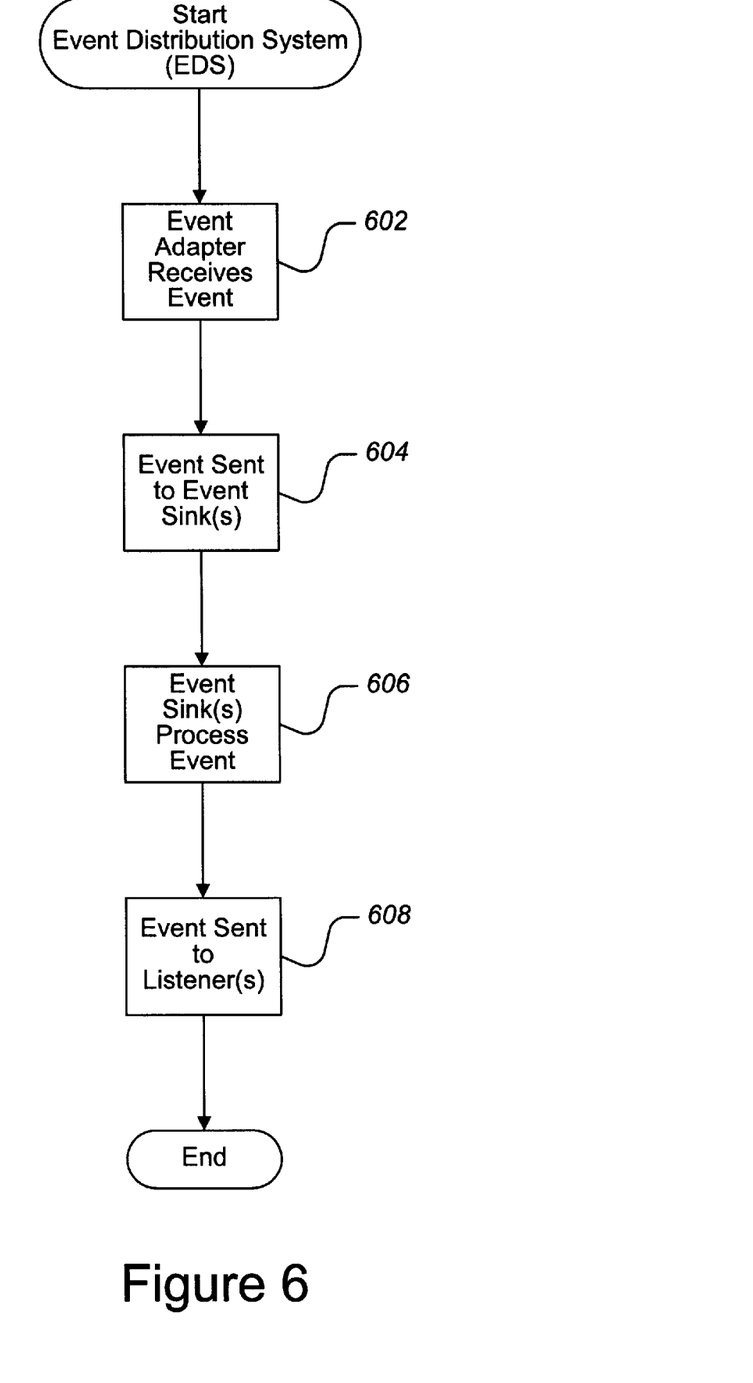
FIG. 6 is a flowchart illustrating the processing of events according to one embodiment of the present invention.
Figure 7:
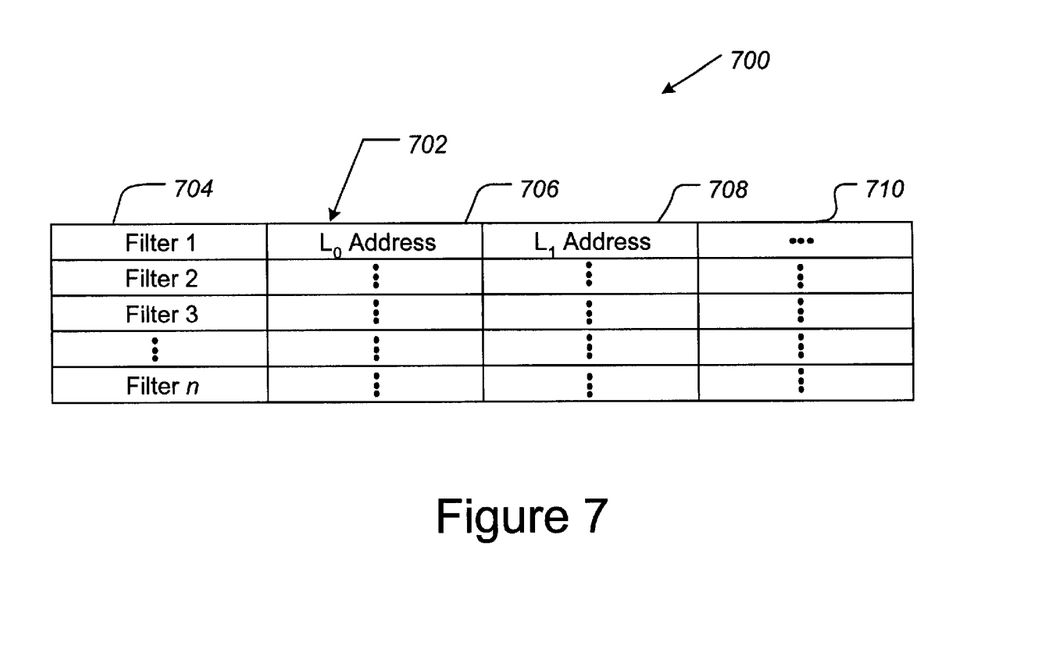
FIG. 7 is an illustration of a filter table in accordance for use by an event sink or event adapter in accordance with one embodiment of the present invention.

The operation of EDS 108 is illustrated in greater detail in FIG. 6. There, an Event Adapter receives an event at 602 as discussed in FIG. 2 above. The event is sent to one or more Event Sinks at step 604 that process the event as described below at step 606. An example of a filter used by an event sink to process an event is illustrated in FIG. 7 at 700. There, a table 702 indicates various filters, e.g., CMIS filters as described above, in column 704. Columns 706–710 nclude the addresses of various listeners $L_0, L_1, \ldots L_n$ where $L_m$ is the address of the $m^{th}$ listener of the n total listeners, if that listener has subscribed to an event that meets the conditions of the corresponding filter in column 702. If the event being processed matches a filter entry, then the listeners whose addresses are in the same row as the matching filter are notified of the event. Returning to FIG. 6, the event is sent to the appropriate listeners at step 608.

Figure 8A:
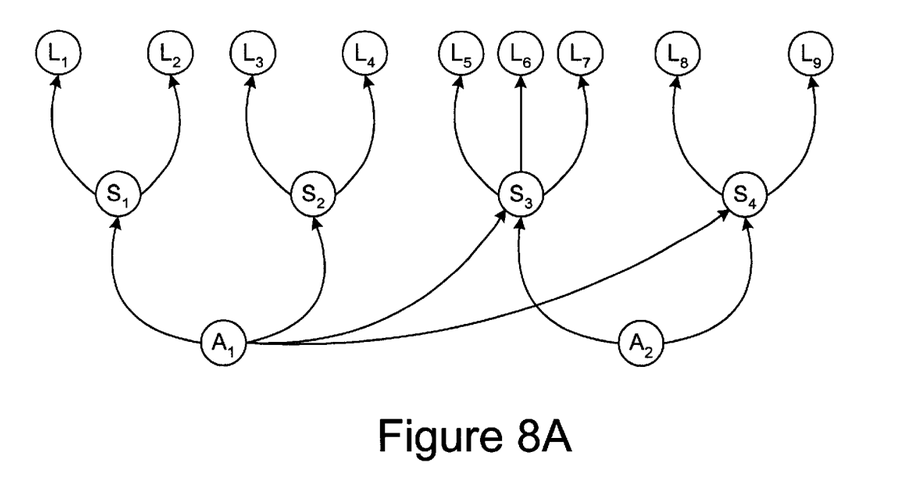
FIG. 8A and FIG. 8B are schematic illustrations of two embodiments of relationships among various event-processing components of the present invention.
Figure 8B:
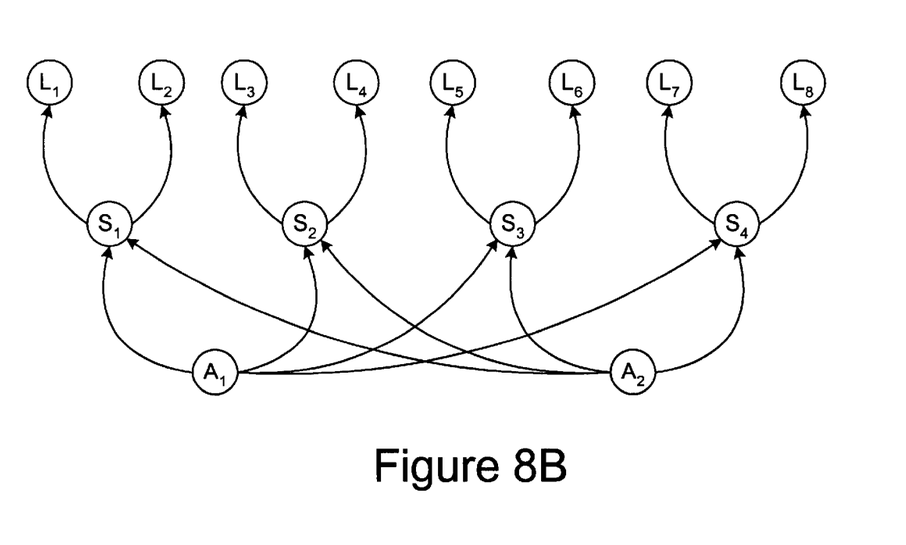

Generally, the EDS will comprise multiple event adapters and event sinks to serve a variety of listeners. These can be arranged in a variety of configurations as illustrated in FIGS. 8A and 8B. One exemplary configuration shown in FIG. 8A includes two event adapters $A_1$ and $A_2$. Adapter $A_1$ is configured to forward events to event sinks $S_1$–$S_4$. Adapter $A_2$ is configured to forward events to event sinks $S_3$ and $S_4$ only. Sink $S_1$ is configured to forward filtered events to listeners $L_1$ and $L_2$. Sink $S_2$ is configured to forward filtered events to listeners $L_3$ and $L_4$. Sink $S_3$ is configured to forward filtered events to listeners $L_5$–$L_7$. Sink $S_4$ is configured to forward filtered events to listeners $L_8$ and $L_9$. In one embodiment, adapters $A_1$ and $A_2$ are configured to receive all types of events and forward those events to the selected sinks. In another embodiment, the adapters are configured to receive events of specific protocols. For example, $A_1$ can be configured to forward CMIS events and $A_2$ can be configured to forward SNMP events. The sinks are assigned to the specified listeners, which, in turn, can be different applications and/or servers. For example, $L_1$–$L_6$ can be applications, such as illustrated at 102 in FIG. 1, and $L_7$ and $L_8$ can be servers such as Topology Server 112 and Logging/Alarm Server 114.

A second exemplary configuration is shown in FIG. 8B. There, adapters $A_1$ and $A_2$ are configured to forward events to each of sinks $S_1$–$S_4$. Sinks $S_1$–$S_4$ forward filtered events to listeners $L_1$–$L_8$ as shown. Again, adapters $A_1$ and $A_2$ can be configured to receive all types of events and forward those events to the selected sinks. Alternatively, the adapters can be configured to receive events encoded in a specific protocol. For example, $A_1$ can be configured to forward CMIS events and $A_2$ can be configured to forward SNMP events. The sinks are assigned to the specified listeners, which, in turn, can be different applications and/or servers.

In one embodiment, the event sinks or event adapters, depending on the configuration used as described above, forward events the event listeners as "unconfirmed" events (i.e., no checking is done to ensure the event was received by the event listener). In another embodiment, the event sink or event adapter is configured to send "confirmed" events. This can be done by configuring the communication between the event sink (adapter) and event listener to have the format event-report-response. In a more specific embodiment, a single event-report-response is sent to the sender of the confirmed event. Other suitable confirmation techniques will be familiar to those having skill in the computer science and network arts. In another embodiment, certain event sinks (adapters) are responsible for handling the confirmed event reports. These particular event sinks (adapters) are configured to generate and send the event-response-report communications. In a more particular variation of this embodiment, which of the event sinks (adapters) so configured are determined by a user-defined criterion (e.g., by the type of event managed by the event sink (adapter)). Such a configuration will be appreciated by those of skill in the computer science and network arts as allowing further distribution of workload by the event sinks (adapters) and greater efficiency.

Figure 9:
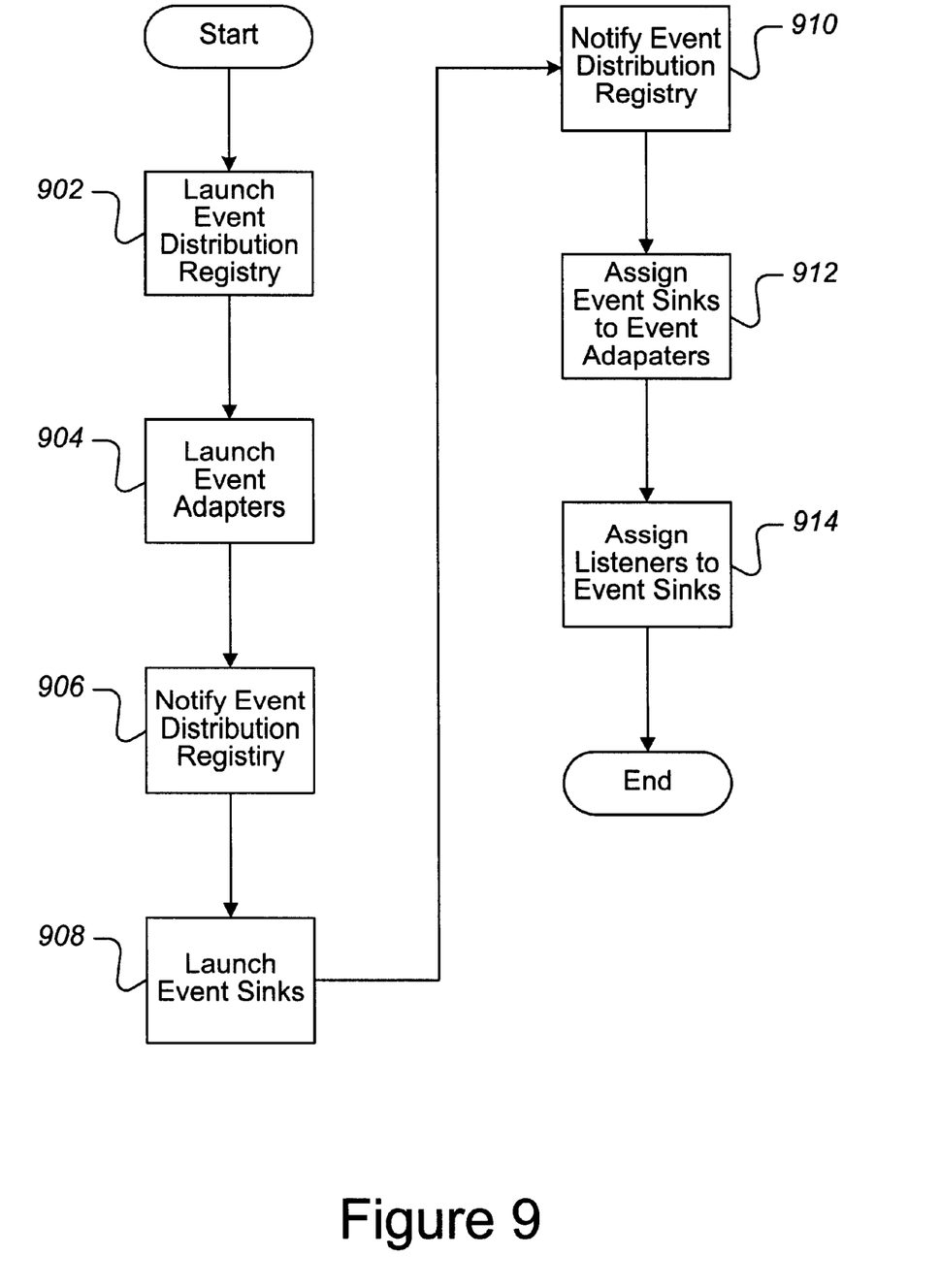
FIG. 9 is a flowchart illustrating the processing of events according to one embodiment of the present invention.

FIG. 9 illustrates an example of a method for configuring the event adapters and event sinks, such as illustrated in FIGS. 8A and 8B. Starting at 902, the Event Distribution Registry ("EDR") is launched As described above, the EDR contains filters and address information necessary to populate the filters and addresses used by the event sinks and/or event adapters. This can be done by prior definition or dynamically. At step 904, the event adapters are launched. In one embodiment, a pre-defined number of event adapters are launched. In another embodiment, the event adapters are launched dynamically as determined by mechanisms configured to monitor event traffic, e.g., MIS 104. At step 906, the event adapter(s) notify the EDR, which in turn configures the event adapter(s). In one embodiment, the EDR configures the event adapters to forward events of a particular protocol (e.g., CMIS). In another embodiment, the EDR configures the event adapters to filter events as well.

At step 908, the event sinks are launched. In one embodiment, a pre-defined number of event sinks are launched. In another embodiment, the event sinks are launched dynamically as determined by mechanisms configured to monitor event traffic, e.g., MIS 104. At step 910, the EDR is notified that the event sinks have been launched. At step 912, the EDR assigns the event adapters to communicate with the event sinks. This can be done using pre-defined relationships, or dynamically using variables such as event traffic volume to determine the connections. The EDR also configures the event sinks with the appropriate filters if the event adapters have not been so configured previously. At step 914, the listeners are assigned to the event sinks.

Figure 10:
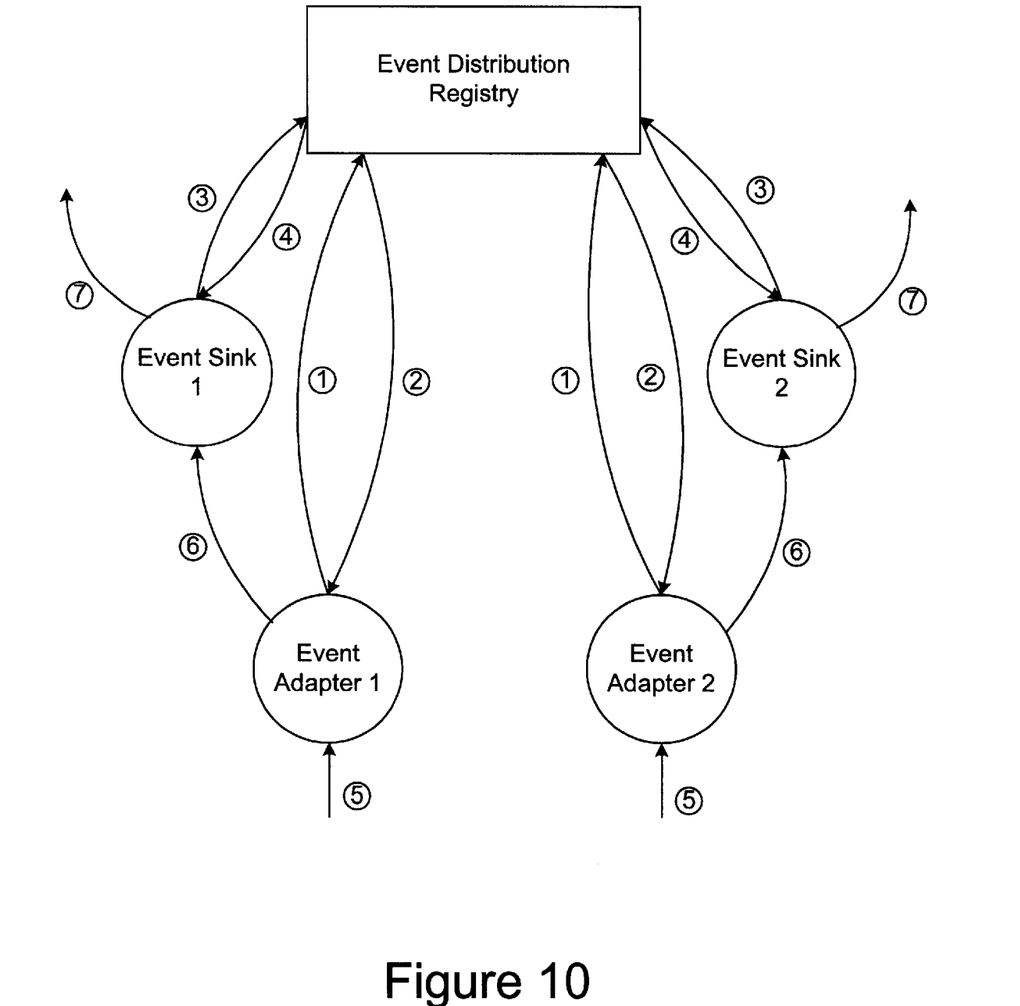
FIG. 10 is a schematic illustration of the relationship among various event-processing components of the present invention.

This sequence of events is illustrated in greater detail in FIG. 10. There, Event Adapters 1 and 2 forward notifications of their creation to the EDR as shown by arrows ①. The EDR configures the Event Adapters as shown by arrows ②. Event Sinks 1 and 2 are launched and notify the EDR as shown by arrows ③. The Event Sinks are configured by the EDR as shown by arrows ④. Events are received by the Event Adapters at ⑤, processed, and forwarded to Event Sinks at ⑥. The Event Sinks process the events and forward the events to listeners at ⑦.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general-purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; holographic storage arrays, and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 11:
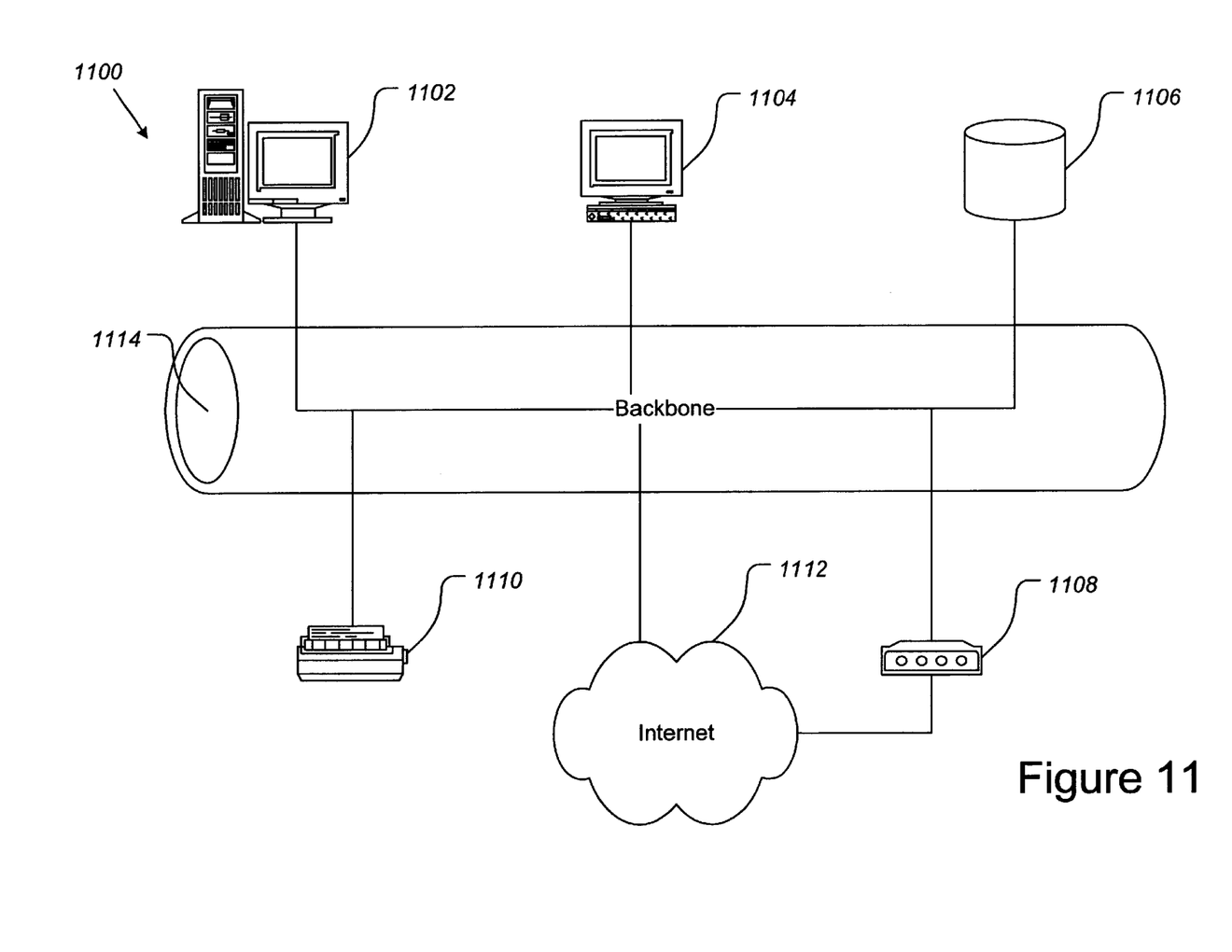
FIG. 11 is a schematic illustration of a computer network.

The present invention further relates to computer networks such as illustrated at 1100 in FIG. 11. There, a server 1102 (which can be a plurality of servers depending on the network configuration) provides network data and management resources for operating network 1100. In one embodiment, the network management software provided by the present invention, in particular, the above-described Name Service is installed and operated from server 1102. Various devices and entities reside on and communicate over the network. These devices and entities include, but are not limited to, client computers 1104, data storage devices 1106, modems and other communications devices 1108, printers other hardcopy input/output devices 1110, and connections to the Internet (which is shown generally at 1112). All of these devices communicate with each other over network backbone 1114. Still other common network devices not shown include hub, routers, packet switchers, switches, hosts, bridges and the like. As noted above, each of these devices can include one or more drivers, agents, and/or proxies that are managed by network management computers such as illustrated at 1102.

Figure 12:
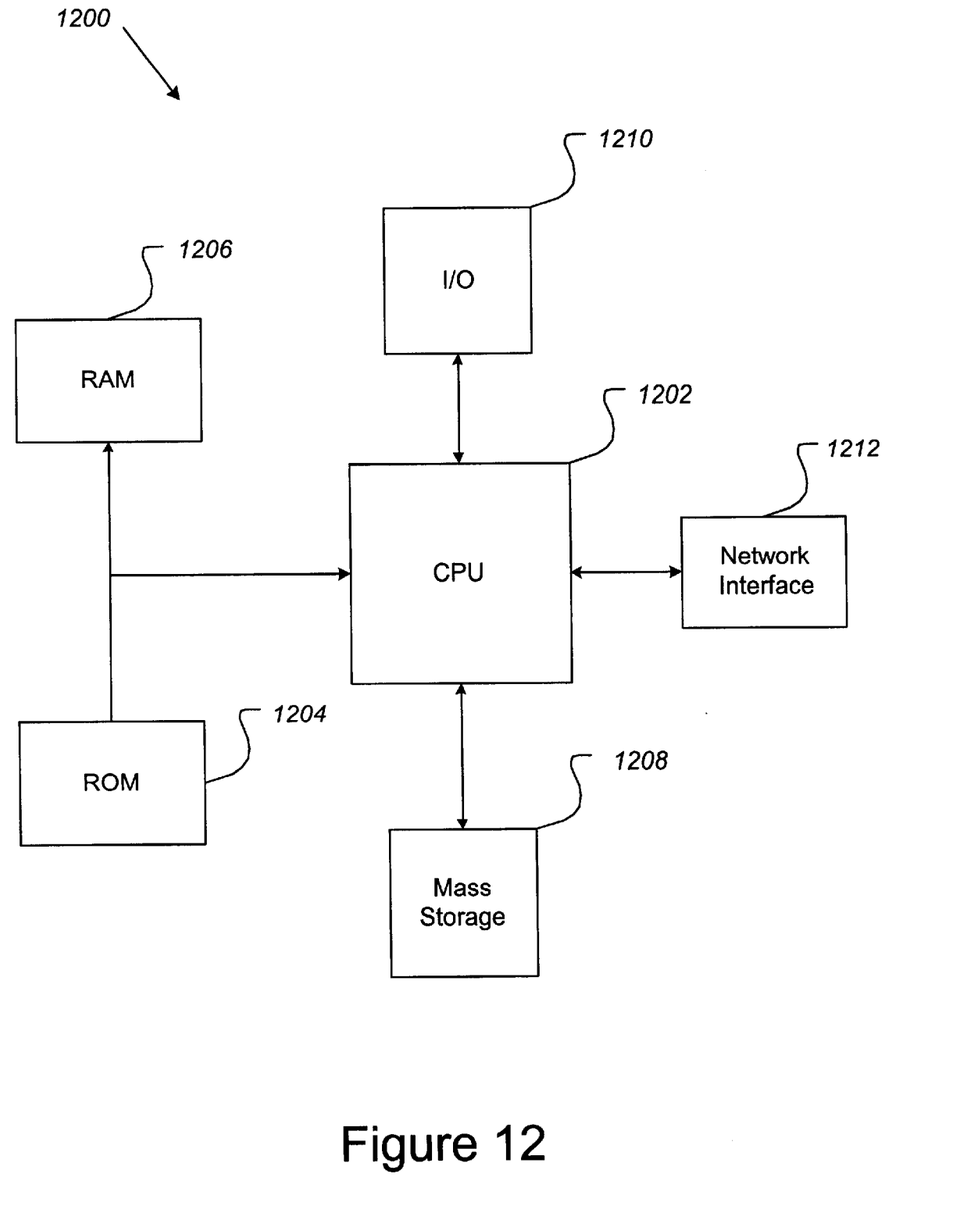
FIG. 12 is a schematic illustration of a computer.

FIG. 12 at 1200 shows a typical computer-based system in accordance with the present invention. Shown is a central processing unit 1202 (CPU) which is coupled to memory devices including read only memory 1204 (ROM) and random access memory 1206 (RAM). As is well known in the art, ROM 1204 acts to transfer data and instructions unidirectionally to the CPU and RAM 1206 is used typically to transfer data and instructions in a bidirectional manner. A mass memory device 1208 is also coupled bidirectionally to CPU 1202 and provides additional data storage capacity. The mass memory device 1208 may be used to store programs, data and the like and may take the form of a magnetic or paper tape reader or some other well known device (e.g., CD-ROM). It will be appreciated that the information retained within the mass memory device 1208, may, in appropriate cases, be incorporated in standard fashion as part of RAM 1206 in the form of virtual memory. CPU 1202 is also coupled to one or more input/output devices 1210 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally can be coupled to a computer or telecommunications network 1214 using a network connection as shown generally at 1212. The above-described devices and materials will be familiar to those of skill in the computer hardware and software arts (see, e.g., Ralston, Anthony, and Reilly, Edwin D. 1993. *Encyclopedia of Computer Science*. Van Norstrand Reinhold; Herzog, James H. 1996. *Design and Organization of Computing Structures*. Franklin, Beedle & Associates, Inc.; Stone, Harold S. 1983. *Microcomputer Interfacing*. Addison Wesley; Martin, James, and Chapman, Kathleen K. 1989. Local Area Networks: *Architectures and Implementations*. Prentice Hall.)

CONCLUSION

Thus, the present invention will be seen to provide an efficient, scalable, and modular software, systems, and methods for providing notification of events received from agents and entities on a computer and communications networks to other agents, entities, and application on such networks. Using the software, systems, and methods described herein name services large, complex networks can be implemented efficiently.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many steps of processing can be implemented in a sequence different from that described herein without altering the invention. In addition, various naming conventions can be used in conjunction with the naming service without significant change to the systems, software, or methods described herein.

What is claimed:

1. A method for reporting events raised by entities running on a computer network, comprising the steps of:

a. providing an event distribution service running on said network, said event distribution service being coupled with an event source and an event listener;
   b. generating an event from said event source;
   c. receiving said event using said event distribution service;
   d. processing said event using said event distribution service; and
   e. forwarding said event to said event listener.

2. The method of claim 1, wherein said step of providing said event distribution service comprises the sub-steps of providing an event sink and an event adapter.

3. The method of claim 2, wherein said step of providing said event distribution service further includes configuring said event sink and event adapter using an event distribution registry.

4. The method of claim 2, wherein said step of receiving said event comprises receiving said event using said event adapter.

5. The method of claim 4, wherein said step of processing includes forwarding said event from said event adapter to said event sink and processing said event using said event sink.

6. The method of claim 5, wherein said step of processing further includes comparing said event against a table of filters.

7. The method of claim 4, wherein said step of processing includes processing said event using said event adapter.

8. The method of claim 7, wherein said step of processing further includes comparing said event against a table of filters.

9. A method as recited in claim 2, wherein said event adapter is configured to receive events having a specific protocol.

10. In a computer network, a system for distributing events generated by an event source to event listeners on said computer network, said event source being located on said computer network, said system comprising:

an event distribution registry configured to provide event filters and event listener addresses corresponding to said event listeners, said event distribution registry being coupled with
   an event adapter, said event adapter being configured to receive events generated by said event source, said event adapter being coupled with
   an event sink, said event sink being configured to forward said events to said event listeners.

11. The system of claim 10, wherein said event distribution registry is configured to assign event sinks to said event adapter and said event listeners to said event sink.

12. The system of claim 11 wherein said event adapter is configured to receive events having a specific syntax.

13. The system of claim 12, wherein said event sink is configured to receive said event filters and said event listener addresses from said event distribution registry.

14. The system of claim 12, wherein said event adapter is configured to receive said event filters and said event listener addresses from said event distribution registry.

15. The system of claim 10, wherein said event sink is configured to filter said events and forward said filtered events to said event listeners.

16. The system of claim 10, wherein said event adapter is configured to filter said events and forward said filtered events to said event sinks, and said event sinks are configured to forward said events to said event listeners.

17. The system of claim 10, wherein event distribution registry is coupled with a management information server, said management information server being configured to enable communications between applications running on said network and devices coupled with said network.

18. The system of claim 17, wherein said event distribution server runs in a process being executed by a processor different from the processor on which the process containing said management information server runs.

19. The system of claim 17, wherein said management information server, said management information server is configured to filter events and forward filtered events to listeners.

20. A computer-readable medium containing computer-readable program code devices embodied thereon, said computer-readable program code devices being configured to cause a computer to perform the steps of:

a. providing an event distribution service on a computer network, said event distribution service being configured to be coupled with an event source and an event listener;

b. receiving an event generated by said event source using said event distribution service;

c. processing said event using said event distribution service; and d. forwarding said event to said event listener.

21. A computer data signal on a carrier wave containing instructions for providing event distribution services, said computer data signal comprising instructions configured to cause a computer to perform the steps of claim 20.

* * * * *